W. A. MORTON.
COMBINED HOLDER AND FEEDER FOR SOLDER AND ROSIN.
APPLICATION FILED JAN. 11, 1916.
1,182,299.
Patented May 9, 1916.
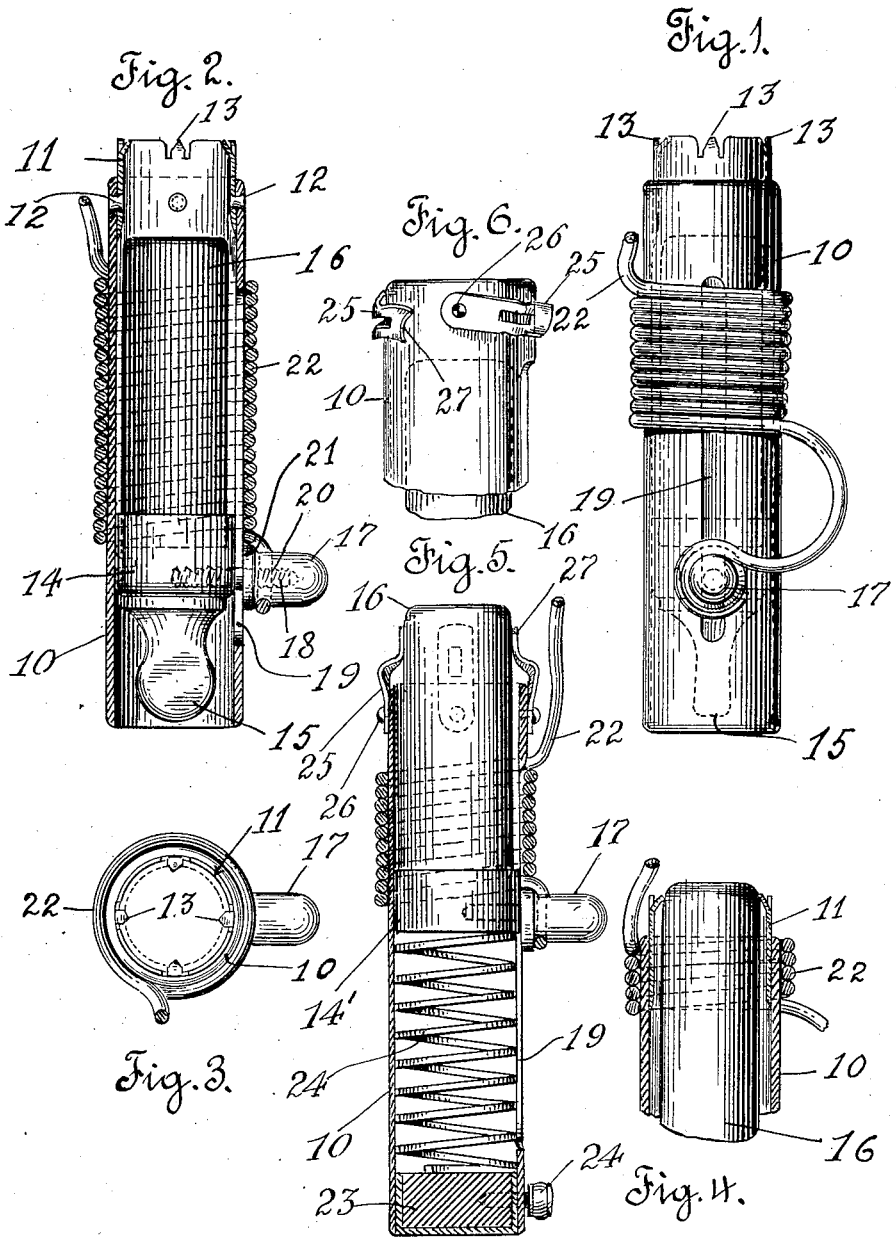

UNITED STATES PATENT OFFICE.

WILLIAM A. MORTON, OF LOS ANGELES, CALIFORNIA.

COMBINED HOLDER AND FEEDER FOR SOLDER AND ROSIN.

1,182,299.  Specification of Letters Patent.  Patented May 9, 1916.

Application filed January 11, 1916. Serial No. 71,462.

*To all whom it may concern:*

Be it known that I, WILLIAM A. MORTON, a citizen of the United States, residing at Los Angeles, in the county of Los Angeles and State of California, have invented new and useful Improvements in Combined Holders and Feeders for Solder and Rosin, of which the following is a specification.

My invention relates to a combined holder and feeder for solder and rosin.

It is an object of this invention to devise a simple yet efficient holder for solder wire and a stick of rosin such as used by tinners and plumbers for soldering, and which is adapted to feed simultaneously the rosin and the solder wire during the soldering operation.

The device consists of a tubular holder in which a stick of rosin is positioned and a coiled wire of the solder metal loosely encircling the outer periphery of the tube, both the stick of rosin and the wire being operatively connected to a knob which is slidably mounted in a longitudinal slot provided in the tube. The knob is provided with means whereby the same may be instantly locked in position or released therefrom. The tube is so constructed however, that while allowing the stick of rosin to be fed therethrough it will prevent the same from falling out if the holder should be inverted.

With the foregoing and other objects in view which will appear as the description proceeds, my invention consists in the construction, combination and arrangement of parts hereinafter described and claimed.

In the accompanying drawings I have illustrated a preferred embodiment of my invention and in which:

Figure 1 is a top plan view of the device. Fig. 2 is a longitudinal sectional view showing the upper half of the tubular casing and the solder wire removed. Fig. 3 is a front end view thereof. Fig. 4 is a sectional detail view showing the rosin and the solder wire in operative position. Fig. 5 is a view similar to Fig. 2 of a modified construction of the device. Fig. 6 is a detail view of the upper part of the modified construction shown in Fig. 5 illustrating the clamping members in inoperative position.

Referring to the drawings, 10 designates a cylindrical tube preferably made of heat insulating material, such as fiber. At the forward end thereof, a tubular metal ring 11 of a diameter to fit snugly within the tube 10 is held rigidly in position by means of fastening devices such as rivets 12. The outer edge of the metal ring 11 is provided with a plurality of prongs or points 13 cut from the metal ring and integral therewith, said prongs being turned inwardly for a purpose hereinafter to be described.

Slidably mounted within tube 10 is a rosin stick receiving member consisting of a tubular socket member 14 mounted on a handle 15. A stick of rosin or rosin composition 16 is mounted in the tubular socket. The stick of rosin is cylindrical in shape and of a diameter to slide within the ring 11. The prongs 13 extend a very slight distance into the rosin as clearly shown in Figs. 3 and 4, and offer sufficient resistance to prevent the same from falling out of the tube when the device is inverted, yet allowing the stick of rosin to be fed out of said ring. A manually operated knob 17, preferably made of heat insulating metal, is connected to the tubular socket 14 by means of a screw member 18 extending through a longitudinal slot 19, which extends through the major portion of the length thereof. The knob 17 is provided with an internal screw threaded socket 20 adapted to be engaged by the outer end of the screw 18. The knob has a shoulder 21 adjacent the tube which furnishes a bearing surface adapted to coöperate with the outer face of the tube 10.

A coiled wire of a suitable soldering metal composition 22 loosely encircles said tube and has its upper end extending adjacent to the stick of rosin as clearly shown in Figs. 3 and 4, the other end of said wire being wound about the knob 17.

In the modified structure shown in Figs. 5 and 6, the tube 10 is closed at the lower end by means of a plug 23 held in position by means of a screw 24. The rosin receptacle 14' is provided with a flat bottom. A coiled spring 24 placed in the tube 10 between the bottom of the receptacle 14' and the plug 23 tends to move the rosin receptacle toward the upper end of the tube. In place of the tubular ring 11 and the rosin engaging points 13 of the structure shown in Figs. 1 to 4, I have provided a plurality of clips 25, pivoted to the upper end of the tube 10 by means of rivets 26. The upper end of the clips 25 are bent inwardly as at 27, and project slightly beyond the projection of the walls of the tube 10.

Operation: From the foregoing description the operation of the device will be easily understood. As the outer end of the solder wire and the rosin is used up in the soldering operation, the knob 17 is loosened from its position by turning the same on the outer end of the screw member 18. The knob is then moved upwardly a slight distance as desired and again screwed into place. The solder wire 22 and the stick of rosin being operatively connected to said knob will move an equivalent distance forward at the outer end of the combined soldering wire and rosin holder and feeder as will be understood.

In the operation of the device as illustrated in Figs. 5 and 6 the stick of rosin is inserted from the top, the clips 25 having first been turned down out of the way as shown in Fig. 6. The coiled spring 24 will move the stick of rosin and the coil of soldering wire 22 outwardly when the thumb screw 17 is loosened. When the desired position of the outer end of the stick of rosin 16 and the upper end of the soldering wire 22 has been reached, the thumb screw is tightened so as to clamp the rosin receptacle securely in place as will be understood.

While I have illustrated and described the preferred construction of the device as now known to me, it will be understood that I do not desire to confine myself to the specific details of construction thereof, as various changes in the construction and arrangement may be made without departing from the spirit of my invention as defined in the appended claims.

I claim:

1. A combined holder and feeder for solder and rosin, comprising a tube having a longitudinal slot parallel to its length, said tube being provided at its upper end with means for frictionally engaging a stick of rosin, a rosin receptacle slidably mounted in said tube, a stick of rosin mounted in said receptacle, a thumb knob operatively connected with said receptacle through said slot and adapted to frictionally engage said tube, a coiled wire of solder metal loosely encircling said tube and connected to said knob, and resilient means tending to move said rosin receptacle toward the rosin end of said tube.

2. A combined holder and feeder for solder and rosin comprising a cylindrical tube having a longitudinal slot parallel to its length, a rosin receptacle slidably mounted in said tube, a stick of rosin mounted therein, means at the outer end of said tube for frictionally engaging said rosin, a pin secured to said receptacle and extending through said slot, the outer end of said pin being screw threaded, a thumb knob in screw threaded engagement with said end, said knob being provided with a bearing face engaging said tube and a coiled wire of solder metal loosely encircling said tube and connected to said knob.

3. A combined holder and feeder for solder and rosin comprising a tube having a longitudinal slot parallel to its length, means at the outer end of said tube for frictionally engaging a stick of rosin, a rosin receptacle slidably mounted in said tube, a stick of rosin mounted in said receptacle, a thumb knob operatively connected with said receptacle and adapted to frictionally engage said tube and a coiled wire of solder metal loosely encircling said tube and connected to said knob.

4. A combined holder and feeder for solder and rosin comprising a tube having a longitudinal slot parallel to its length, a rosin receptacle slidably mounted in said tube, a stick of rosin mounted in said receptacle, a thumb knob operatively connected to said receptacle and adapted to frictionally engage said tube and a coiled wire of solder metal loosely encircling said tube and connected to said knob.

5. A combined holder and feeder for solder and rosin, comprising a tube having a longitudinal slot parallel to its length, means for holding a stick of rosin slidably mounted in said tube, a connecting member extending from said means through said slot, a thumb knob engaging the outer end of said member in screw threaded relation and adapted to frictionally engage said tube and a wire of solder metal encircling said tube and connected to said knob.

6. A combined holder and feeder for solder and rosin comprising a tube having a longitudinal slot parallel to its length, means for holding a stick of rosin slidably mounted in said tube, manually operated means connected to said first named means through said slot adapted to frictionally engage said tube, and a wire of solder metal connected to said manually operated means and extending adjacent to said stick of rosin whereby the solder metal is simultaneously advanced with the stick of rosin.

In testimony whereof I have signed my name to this specification.

WILLIAM A. MORTON.